(12) United States Patent
Roberts (10) Patent No.: US 7,895,512 B2
(45) Date of Patent: Feb. 22, 2011

(54) CAPTURING AND PROCESSING CHANGE INFORMATION IN A WEB-TYPE ENVIRONMENT

(75) Inventor: Andrew Roberts, Melrose, MA (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 11/533,807

(22) Filed: Sep. 21, 2006

(65) Prior Publication Data

US 2008/0077848 A1     Mar. 27, 2008

(51) Int. Cl.
    *G06F 17/00* (2006.01)
(52) U.S. Cl. ........................ 715/229; 715/256
(58) Field of Classification Search ............... 715/229, 715/256, 255, 230, 234, 236, 239
    See application file for complete search history.

(56) References Cited

U.S. PATENT DOCUMENTS

| | | | | |
|---|---|---|---|---|
| 6,128,655 | A * | 10/2000 | Fields et al. | 709/219 |
| 6,446,113 | B1 | 9/2002 | Ozzie et al. | |
| 6,772,165 | B2 * | 8/2004 | O'Carroll | 1/1 |
| 6,859,821 | B1 | 2/2005 | Ozzie et al. | |
| 7,069,504 | B2 * | 6/2006 | Mani et al. | 715/239 |
| 7,210,100 | B2 * | 4/2007 | Berger et al. | 715/229 |
| 2001/0027460 | A1 * | 10/2001 | Yamamoto et al. | 707/536 |
| 2002/0062325 | A1 * | 5/2002 | Berger et al. | 707/518 |
| 2002/0194382 | A1 * | 12/2002 | Kausik et al. | 709/246 |
| 2003/0079180 | A1 * | 4/2003 | Cope | 715/511 |
| 2003/0121006 | A1 * | 6/2003 | Tabata et al. | 715/513 |
| 2003/0167446 | A1 * | 9/2003 | Thomas | 715/513 |
| 2004/0194016 | A1 * | 9/2004 | Liggitt | 715/501.1 |
| 2004/0268230 | A1 | 12/2004 | Liu et al. | |
| 2006/0004691 | A1 | 1/2006 | Sifry | |
| 2006/0004709 | A1 * | 1/2006 | Borthakur et al. | 707/3 |
| 2006/0031379 | A1 | 2/2006 | Kasriel et al. | |
| 2006/0059253 | A1 | 3/2006 | Goodman et al. | |
| 2006/0085738 | A1 | 4/2006 | Chapus et al. | |
| 2007/0198635 | A1 * | 8/2007 | Lindner et al. | 709/203 |
| 2008/0010587 | A1 * | 1/2008 | Wake et al. | 715/234 |

OTHER PUBLICATIONS

Hunt, James J., et al, "Using the Web for Document Versioning: An Implementation Report for Delta V", ICSE '01: Proceedings of the 23rd International Conference on Software Engineering, IEEE Computer Society, Jul. 2001, pp. 507-513.*

Ozzie et al., "Simple Sharing Extensions for RSS and OPML", <http://msdn.microsoft.com/xml/rss/sse/>, visited Sep. 5, 2006.

(Continued)

*Primary Examiner* — Laurie Ries
(74) *Attorney, Agent, or Firm* — Cuenot, Forsythe & Kim, LLC (57) ABSTRACT

A source markup language document and a modification to the source markup language document can be identified. One or more delta documents specifying the modification to the source markup language document can be created. The delta document can be independent of the source markup language document and can be coded in a different language than the source markup language document. The source markup language document and the delta document can be stored within a data storage device.

14 Claims, 6 Drawing Sheets

OTHER PUBLICATIONS

"The Atom Syndication Format", <http://atompub.org/2005/07/11/draft-ietf-atompub-format-10.html>, visited Sep. 5, 2006.

"Code Merging Algorithms—RevCtrl Wiki", <http://revctrl.org/FrontPage>, visited Sep. 5, 2006.

Cohen, "The Criss-Cross Merge Case", <http://www.gelato.unsw.edu.au/archives/git/0504/2279.html>, visited Sep. 5, 2006.

Berners-Lee, et al., "Delta: An Ontology for the Distribution of Differences Between RDF Graphs", <http://www.w3.org/DesignIssues/Diff>, visited Sep. 5, 2006.

"DeltaXML—Diff/Merge for XML Documents", <http://www.deltaxml.com/products/core/index.html>, visited Sep. 5, 2006.

Udel, "Visualizing Change", <http://weblog.infoworld.com/udell/2005/06/24.html>, visited Sep. 5, 2006.

* cited by examiner

FIG. 1

```
<?xml version="1.0"?>
<rss version="2.0">
        <channel>
                <title>Jobs</title>
                <link>http://www.jobs.com/support/jobs/</link>
                <description>Information about job openings at IBM.</description>
                <item>
                        <title>HR Analyst - Mountain View </title>
                        <link>http://www.ibm.com/support/jobs/bin/topic.py?dep_id=1&loc_id=16</
                                link>
                        <description>We have an immediate need for an experienced analytical HR
                                professional. The ideal candidate has a proven record of developing analytical
                                frameworks to make fact-based decisions.</description>
                </item>
        </channel>
</rss>
```

FIG. 2

```
<?xml version="1.0"?>
<delta version="0.1" xmlns="http://delta.org/delta/ns#" >
        <start>http://www.url1.com/rss1.xml</start>
        <operations>
                <remove id="1">
                        <date>2003-10-22T01:25:52Z</date>
                        <path>/rss/channel/item[1]/description</path>
                </remove>
                <add id ="2">
                        <date>2003-10-22T01:25:53Z</date>
                        <path>/rss/channel/item[1]/*[2]</path>
                        <value>
                                <description>This is a better description.</description>
                        </value>
                </add>
        </operations>
</delta>
```

FIG. 3

```
<?xml version="1.0"?>
<rss version="2.0">
        <channel>
                <title>Jobs</title>
                <link>http://www.ibm.com/support/jobs/</link>
                <description>Information about job openings at IBM.</description>
                <item>
                        <title>HR Analyst - Mountain View </title>
                        <description>This is a better description.</description>
                        <link>http://www.ibm.com/support/jobs/bin/topic.py?dep_id=1&loc_id=16</link>
                </item>
        </channel>
</rss>
```

FIG. 4

```
<?xml version="1.0" encoding="utf-8"?>
<feed xmlns=http://www.w3.org/2005/Atom xml:lang="en-US">
        <title>Example Feed</title>
        <subtitle>Insert witty or insightful remark here</subtitle>
        <link href="http://example.org/"/>
         <updated>2003-12-13T18:30:02Z</updated>
        <author>
                <name>John Doe</name>
        </author>
        <id>urn:uuid:60a76c80-d399-11d9-b93C-0003939e0af6</id>
        <entry>
                <title>Atom-Powered Robots Run Amok</title>
                <link href="http://example.org/2003/12/13/atom03"/>
                <id>urn:uuid:1225c695-cfb8-4ebb-aaaa-80da344efa6a</id>
                <updated>2003-12-13T18:30:02Z</updated>
                <summary>Some text.</summary>
        </entry>
</feed>
```

FIG. 5

```
<?xml version="1.0"?>
<delta version="0.1" xmlns="http://delta.org/delta/ns#" >
        <start>http://www.url1.com/atom1.xml</start>
        <operations>
                <remove id="1">
                        <date>2003-10-22T01:25:52Z</date>
                        <path>/feed/entry[1]/title</path>
                </remove>
                <add id ="2">
                        <date>2003-10-22T01:25:53Z</date>
                        <path>/feed/entry[1]/*[1]</path>
                        <value>
                                <title>Atom-Powered Robots Gone Wild</title>
                        </value>
                </add>
        </operations>
</delta>
```

```
<?xml version="1.0"?>
<delta version="0.1" xmlns="http://delta.org/delta/ns#" >
        <extends>http://www.url1.com/delta2.xml</extends>
        <operations>
                <add id ="1">
                        <date>2003-10-24T01:25:53Z</date>
                        <path>/feed/entry[2]</path>
                        <value>
                                <entry>
                                        <title>Foo</title>
                                        <link rel="alternate" type="text/html" href="http://foo.org/foo1"/>
                                        <id>tag:diveintomark.org,2003:3.2397</id>
                                        <issued>2003-12-13T08:29:29-04:00</issued>
                                        <modified>2003-12-13T18:30:02Z</modified>
                                </entry>
                        </value>
                </add>
        </operations>
</delta>
```

CAPTURING AND PROCESSING CHANGE INFORMATION IN A WEB-TYPE ENVIRONMENT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The Internet and World Wide Web (collectively the "Web") continues to grow at a rapid pace. This growth has been, and continues to be, aided by the standardization of the vast amount of content that is available through the Web. Growth of the Web means not only that new electronic documents, i.e., markup language documents and other digital content, are being added on a daily basis, but also that existing electronic documents continue to change and evolve over time.

Presently, there is no standard way of capturing and/or representing changes that have been made to electronic documents over time within a Web-type of environment. Some available technologies facilitate the publication of different versions of a given document. Languages such as Hypertext Markup Language (HTML), Rich Site Summary (RSS) and Atom feeds, and Wikipedia, for example, facilitate the publication of different versions of documents. These technologies, however, lack the ability to explicitly illustrate the chronology of changes implemented in moving from one version of an electronic document to the next. Instead, they capture the before and after states of documents in the form of versions. In other words, these technologies do not provide a formal way of describing the "work" that produced the new or revised version of the electronic document. Accordingly, when viewing the Web at a given point in time, one is presented with a snapshot of the data as it exists at that moment, without any historical context or perspective relating to the modifications that have been made to the data over time.

Some proposed solutions for illustrating document change histories have involved the extension of existing languages. Such solutions have several disadvantages. One disadvantage is that any change data that may be specified becomes commingled with the original electronic document. This can cause the original electronic document to become bloated in size and further alters the context of the original data in the electronic document. Moreover, a system that embraces extensions must be defined for each different language that is to be "extended". This results in the implementation of many different solutions for a single problem, i.e., one solution for each language to be extended. Still other solutions communicate change data, but lack a mechanism for persistently storing the change data in a useable form that can be used for subsequent processing or application to electronic documents.

BRIEF SUMMARY OF THE INVENTION

The present invention is directed to expressing and/or applying change histories to electronic documents within a Web or Web-like environment. One embodiment of the present invention can include a method of expressing a change history for a markup language document. The method can include identifying a source markup language document and at least one modification to the source markup language document. One or more delta documents specifying the modification to the source markup language document can be created. The delta document can be independent of the source markup language document and can be coded in a different language than the source markup language document. The source markup language document and the delta document also can be stored within a data storage device.

Another embodiment of the present invention can include identifying a plurality of source markup language documents and at least one modification to each of the plurality of source markup language documents. One or more delta documents can be created that can specify the modification(s) for each of the plurality of source markup language documents. The delta document(s) can be independent of each of the plurality of source markup language documents and can be coded in a different language than each of the plurality of source markup language documents. The plurality of source markup language documents and the delta document can be stored within a data storage device.

Yet another embodiment of the present invention can include a machine readable storage being programmed to cause a machine to perform the various steps and/or functions described herein.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but is not limited to, an electronic, magnetic, optical, electromagnetic, infrared, or semiconductor system, apparatus, device, biological encoding mechanism, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as JAVA™, SMALLTALK, C++, or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments described herein are directed to change histories of electronic documents within the Internet or World Wide Web (collectively "Web") or a Web-type environment. In accordance with the inventive arrangements disclosed herein, data specifying explicit modifications to an electronic document can be recorded within one or more electronic documents referred to as delta documents. A delta document is independent and separate from the electronic document for which the delta document specifies modifications. By recording explicit modifications to an electronic document within a delta document, a history of the exact changes made to the electronic document over a portion of the life of that electronic document can be maintained. Further, by storing the electronic document and the delta document, a state of the electronic document can be restored for points in the past by applying one, or more, or all of the changes specified in the delta document to the corresponding electronic document.

Figure 1:
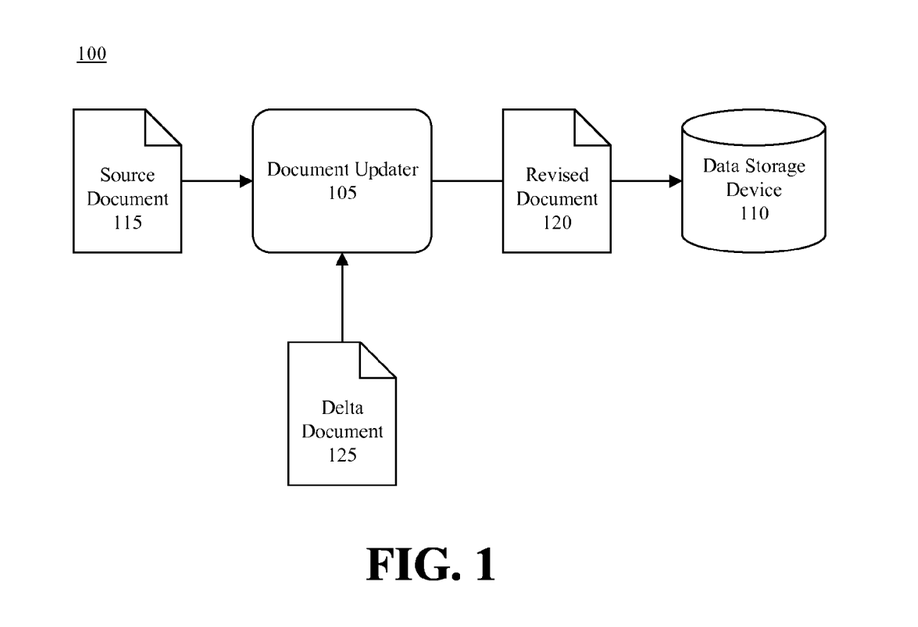
FIG. 1 is a block diagram illustrating a system in accordance with one aspect of the present invention.

FIG. 1 is a block diagram illustrating a system 100 configured in accordance with one aspect of the present invention. As shown, the system 100 can include a document updater (updater) 105 and a data storage device 110. In one embodiment, the updater 105 can be implemented as a computer program executing within a suitable information processing system. In another embodiment, the updater 105 can be included as a component within another, larger application program, such as one capable of creating and/or editing a source document 115. The data storage device 110 can be implemented within the same information processing system in which the updater 105 executes, within another information processing system, and/or another network accessible device.

As shown, the updater 105 can access or open a source document 115. The source document 115 can be an electronic document of a type that can be made available on the Web. In one embodiment, for example, the source document 115 can be a markup language document such as an eXtensible Markup Language (XML) document, a Hypertext Markup Language (HTML) document, a Voice Extensible Markup Language (VoiceXML) document, or the like, including any subsets or supersets of such markup language document types. The updater 105 can apply modifications or changes to the source document 115 as specified in a delta document 125.

The delta document 125 is a separate document than the source document 115 and specifies one or more changes or modifications to be applied to the source document 115. Further, the delta document 125 can be coded or programmed in a different language than the source document 115. By utilizing separate documents for specifying modifications for source documents, commingling of the data to be changed and the actual changes to be implemented is prevented. Bloating of the source document 115 also can be avoided as changes to the source document 115 are maintained separately. The context of any data within the source document 115 also is preserved by storing changes in the delta document 125 rather than within the source document 115. For example, storing change information, such as the location and type of change, in the document itself alters the original content of the document. It should be appreciated, however, that a single delta document 125 or a plurality of delta documents 125 can be used to specify a change history for the source document 115 or for a plurality of source documents 115, as will be described herein in further detail.

In one embodiment, the delta document 125 can be implemented in an XML-based markup language. Changes made to the source document 115 can be persisted to the delta document 125, which can be stored and accessed on the Web, or other network in which the system 100 is implemented, via a universal resource identifier (URI). As such, the modifications to the source document 115 that are specified by the delta document 125 can be integrated into the Web or other network environment, but maintained independently from the data, i.e., source document 115, that is to be changed in accordance with the delta document 125. This implementation further allows a change history to be maintained or stored for modifications of the delta document 125 itself. That is, additional delta documents can be created which specify changes to the delta document 125.

In one embodiment, the delta document 125 can include one or more delta operations. Each delta operation can be an "add" operation or a "remove" operation. A delta document further can specify a "start" or "end" document (source document) as the context for which the operations are to be applied. Each delta operation also can have a precise date and/or time stamp (time stamp), as well as a reference to a location within the source document 115. In one embodiment, while "add" and/or "remove" operations can be specified, a delta document can include content, but exclude logic that is to be executed by a processor as may be specified in a conventional programming language. The location can be specified as an XPath reference, though the embodiments disclosed herein are not intended to be limited to any particular protocol. The delta operations also can hold or specify a copy or reference to a value that is to be changed.

The updater 105 can process the delta document 125 by applying the set of delta operations in a "forward" manner to a referenced "start" document, or in a "reverse" manner to a referenced "end" document. Accordingly, each delta operation of the delta document 125 is understood and meaningful in the context of all preceding delta operations having been applied. Without having processed the sequence of delta operations prior to a particular delta operation, the context, or state, of the source document 115 will not be valid for that delta operation. In illustration, consider the case where an "add" operation adds an element to the source document 115. The next delta operation may reference a portion of the added element and, thus, is logical only if the preceding delta operation has been performed.

The updater 105 can apply the delta operations of the delta documents 125 to the source document 115 to produce a revised document 120. The revised document 120 can be stored within the data storage device 110. Further, the delta document 125 can be stored within data storage device 110 or another such storage mechanism (not shown) if so desired. By maintaining the delta document 125 and the source document 115, information relating to the work that was performed, i.e., the change history, in creating the revised document 120 from the source document 115 can be maintained.

For example, if the source document 115 and the revised document 120 are saved, but the delta document 125 is discarded, the set of actual changes applied to the source document 115 may not be recoverable. A comparison of the source document 115 and the revised document 120 without the benefit of the delta document 125 may lead one to deduce that one large edit replacing content was performed when, in fact, many smaller edits were implemented on a step-by-step basis.

Figure 2:
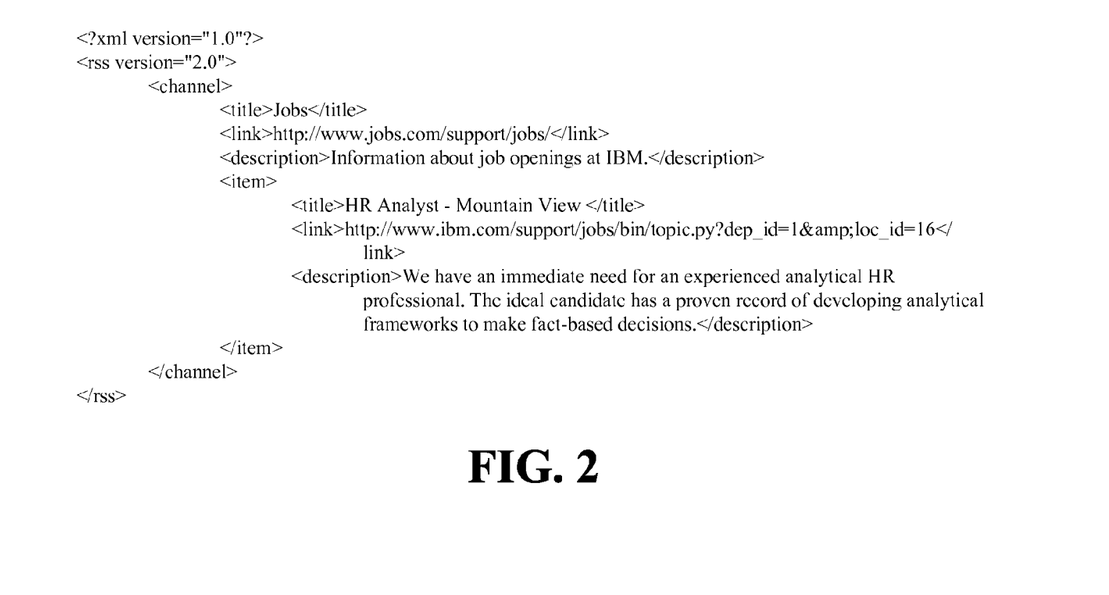
FIG. 2 is an exemplary listing of source code for a source document in accordance with another aspect of the present invention.

FIG. 2 is an exemplary listing of source code for a source document in accordance with another aspect of the present invention. The source document illustrated in FIG. 2 is a Rich Site Summary (RSS) feed. In this case, the source document can be a "start" document. The source document can be located at a fictitious Web site having a URI of http://www.url1.com/rss1.xml.

Figure 3:
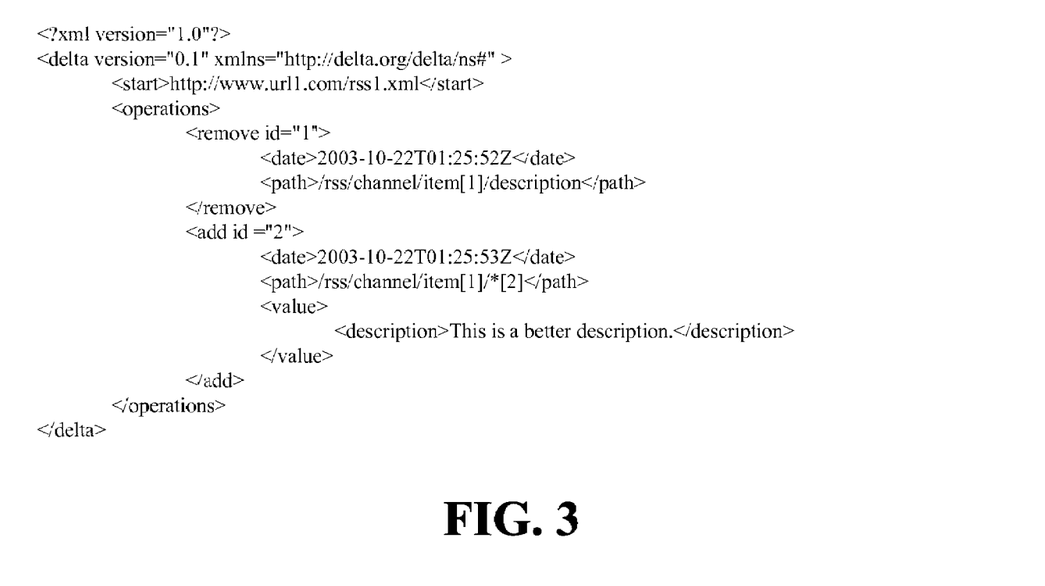
FIG. 3 is an exemplary listing of source code for a delta document in accordance with another aspect of the present invention.

FIG. 3 is an exemplary listing of source code for a delta document in accordance with another aspect of the present invention. More particularly, the delta document of FIG. 3 specifies delta operations to be applied to the source document of FIG. 2. The delta document can be specified in a markup language referred to as "DeltaXML". In this illustration, the delta document can be located or stored at a URI of http://www.url1.com/delta1.xml. The modification specified by the delta document is a change to the text description "We have an immediate need for an experienced analytical HR professional. The ideal candidate has a proven record of developing analytical frameworks to make fact-based decisions." as set off by the <description> element of the source document of FIG. 2. Further, the modification can change the order of the description so that the description is presented prior to the <link> element.

As shown, the delta document of FIG. 3 includes a <delta> element that includes an <operations> element. The operations element contains an ordered sequence of <add> and <remove> elements. It should be appreciated, however, that a delta document can include one or more of only "add" operations, one or more of only "remove" operations, or any combination thereof. In any case, these elements specify the delta operations that are applied to the source document, which is indicated by the <start> element.

The <start> element must have a valid URI format, but also can be blank. A blank source indicates that the delta document represents the creation of a new source document, rather than a set of changes to an existing document. In that case, the first delta operation would need to be an <add> and the location would be blank in order to substantiate the new start document. The order of the sequence of <add> and <remove> elements, specifying "add" and "remove" operations, corresponds to the order of operations, i.e., the order in which the delta operations are to be applied to the source document. Each <add> and <remove> element has an "id" attribute that is unique within the context of the parent <operations> element. The value of an "id" attribute does not have to be a valid URI, nor does the value of an "id" attribute have to be globally unique by way of a mechanism such as "tag" URI format. Such is the case as an "id" attribute is valid only in the context of the sequence of delta operations specified within the <operations> element.

The "remove" operation includes a <path> element that specifies the path to the instance of the object in the source document that is to be removed. In this case, the term "object"

can refer to an element and/or an attribute. If the object being removed is an element, the path can be an identifier for the instance of the element. If the object to be removed is an attribute, the path can be an identifier that specifies both the name of the attribute and a particular element instance. If the path resolves to multiple object instances, each of the object instances can be operated upon by the updater that is interpreting or executing the delta document. In one embodiment, the paths can be specified using XPath. It should be appreciated, however, that paths and locations within source documents can be specified using any suitable means. As such, the present invention is not intended to be limited solely to the use of one particular language and/or convention.

A "remove" operation removes the portion of the source document including the start tag, and continuing up to, and including, the end tag. If a value of an attribute is to be removed or changed, the attribute can be removed from the element. The attribute then can be added using a null or a different value.

In the case of an "add" operation, the location in the source document where the element specified by the delta operation is to be added must be specified. For element locations, the path to the element instance can be specified along with a position within the values specified by the element. For example, "//rss/channel/item[1]/*[2]" can indicate a reference to the first <item> element in the channel element and the second position among the children of that <item> element.

Attribute locations can be referenced through the name of the attribute in a specific instance of an element. The value that is to be added during an "add" operation can be specified as the content of a <value> element. FIG. 3 illustrates the case where a value to be added is explicitly specified. In another embodiment, however, the value to be added can be implicitly specified as a reference to a block of data that resides in an external or different document than the delta document. In that case, the document can be referenced by a URI and path to the instance of the object of the external document to be used for the "add" operation.

FIG. 3 further illustrates that each of the <add> and <remove> elements includes a <date> element. In one embodiment, however, the date can be specified using Internet Engineering Task Force (IETF) Request for Comment (RFC) 3339 format, though the embodiments disclosed herein are not intended to be limited to the use of any particular format or specification. As delta operations are listed in the order in which the operations are to be applied, in the case of a single delta document, the date and time information may not be critical for ordering the application of the delta operations to a source document. When comparing delta operations in two or more delta documents relating to a common, or single, source document, the date and time information is needed to resolve the order in which such delta operations are to be applied.

Figure 4:
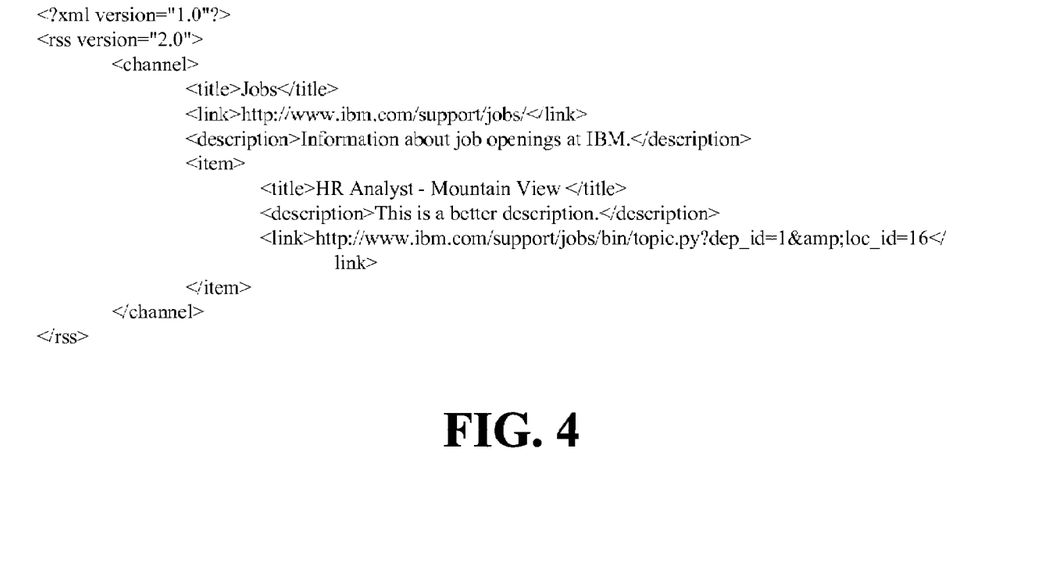
FIG. 4 is an exemplary listing of source code for a revised source document after application of one or more delta operations in accordance with another aspect of the present invention.

FIG. 4 is an exemplary listing of source code for a revised source document after application of one or more delta operations in accordance with another aspect of the present invention. More particularly, the revised source document of FIG. 4 is the resulting document, i.e., revised document, obtained by application of the delta document illustrated with reference to FIG. 3 to the source document illustrated with reference to FIG. 2. As specified by the delta document, a new <description> element is located prior to the <link> element.

Figure 5:
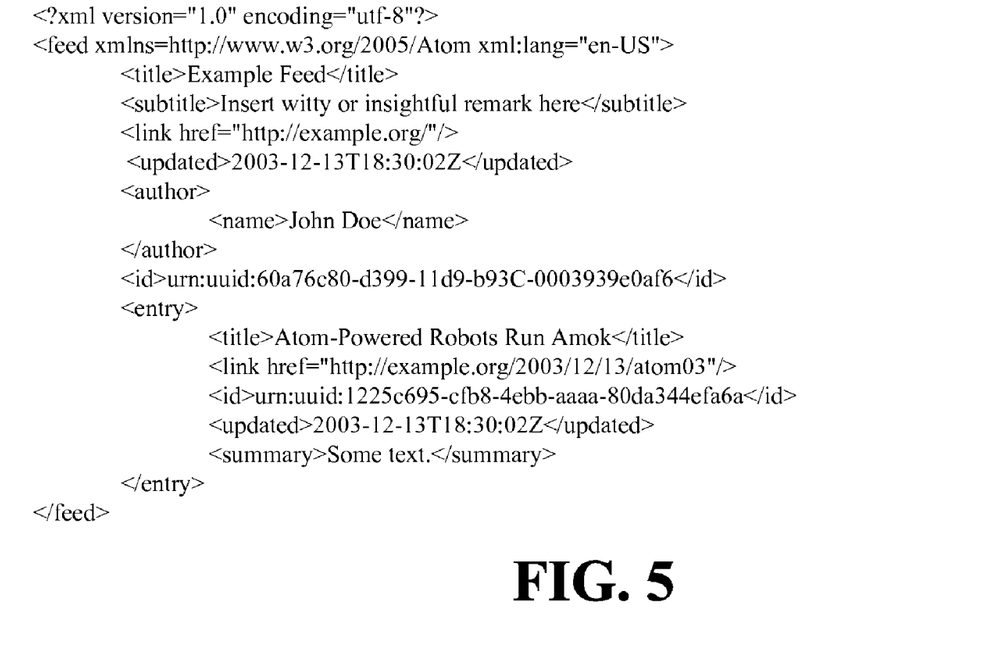
FIG. 5 is an exemplary listing of source code for a source document in accordance with another aspect of the present invention

FIG. 5 is an exemplary listing of source code for a source document in accordance with another aspect of the present invention. The source document of FIG. 5 is implemented as an Atom-based feed and can have a fictitious URI of http://www.url1.com/atom1.xml.

Figure 6:
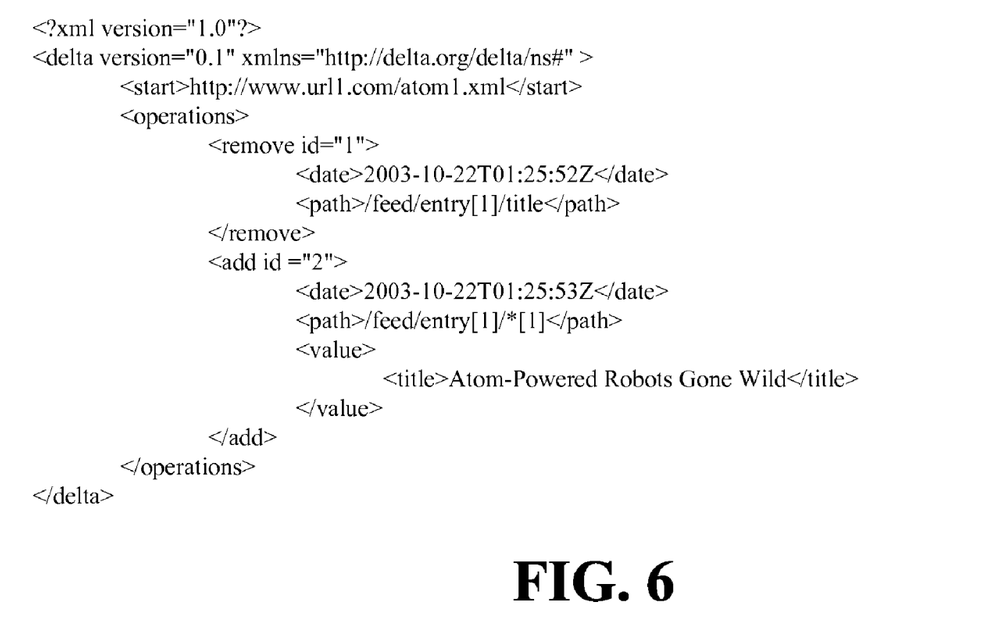
FIG. 6 is an exemplary listing of source code for a delta document in accordance with another aspect of the present invention.

FIG. 6 is an exemplary listing of source code for a delta document in accordance with another aspect of the present invention. The delta document of FIG. 6 can be applied to the source document illustrated in FIG. 5. As such, the delta document of FIG. 6 illustrates one manner of specifying a delta operation to change the title of the source document as specified in the <entry> element. The delta document can have a fictitious URI of http://www.url1.com/delta2.xml.

Figure 7:
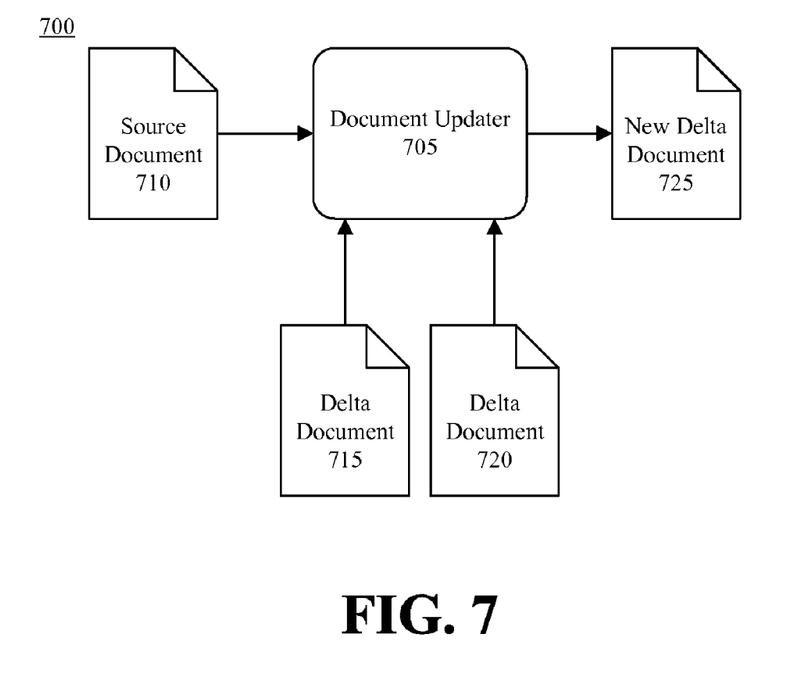
FIG. 7 is a block diagram illustrating a system configured in accordance with another aspect of the present invention.

FIG. 7 is a block diagram illustrating a system 700 configured in accordance with another aspect of the present invention. The system 700 can function substantially similar to the system described with reference to FIG. 1. In this embodiment, the updater 705 performs a merge of two delta documents 715 and 720 to create a new delta document 725. Each of the delta documents 715 and 720 specifies modifications to be implemented in the source document 705.

In operation, the updater 705 can interleave the delta operations of delta documents 715 and 720 according to chronology as specified by the time stamp of each individual delta operation. In one embodiment, the updater 705 can be configured to produce a notification or throw an exception in the event that a delta operation becomes invalid. An invalid delta operation can be one in which, assuming all preceding delta operations have been applied to the source document 710 in order, a given delta operation specifies a path in the source document 710 that cannot be resolved. Such can be the case, for example, where a delta operation removes an entire element and a subsequent delta operation references the element that was removed.

Still, in another embodiment, one or more rules can be implemented within the updater 705 to avoid the case of an exception. For example, a rule can be specified to add the removed element back into the source document 710 and then apply the previously invalid delta operation. In another embodiment, an invalid delta operation can be ignored.

Figure 8:
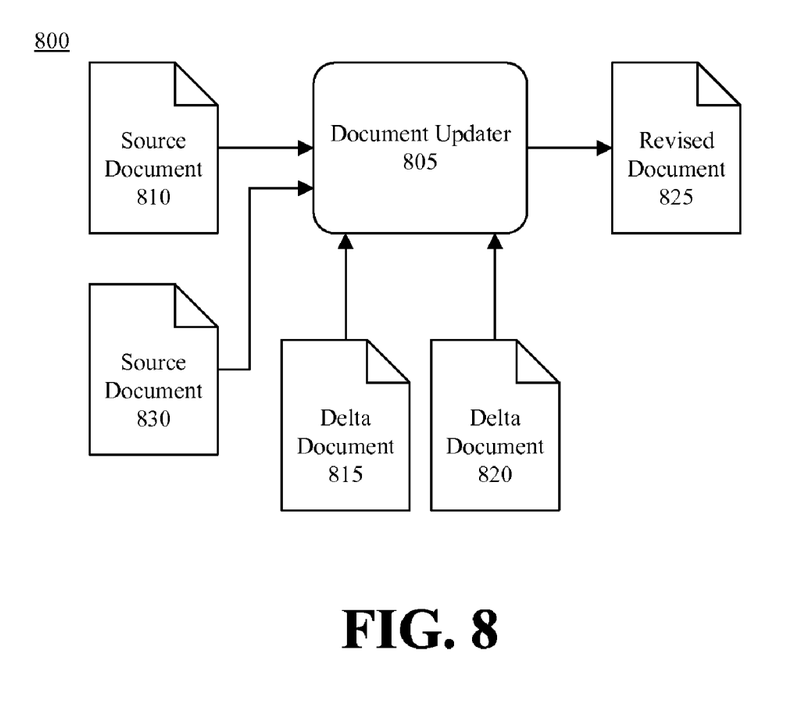
FIG. 8 is a block diagram illustrating a system configured in accordance with another aspect of the present invention.

FIG. 8 is a block diagram illustrating a system 800 configured in accordance with another aspect of the present invention. In this embodiment, the updater 805 is configured to merge delta documents 815 and 820 to produce a new delta document 825. In this case, however, delta document 815 specifies the delta operations to be applied to the source document 810 and the delta document 820 specifies the delta operations to be applied to the source document 830. Thus, in this embodiment, the two source documents 810 and 830 are different.

In the embodiment illustrated in FIG. 8, each delta operation must first be examined in the context of its own source document. The updater 805 can determine if the creation of a new delta operation in a new delta document is possible. The possibility exists for a delta operation in delta document 815 to include a reference to a source document that makes no sense in the context of the new delta document. If that is the case, the updater 805 can be configured to throw an exception.

For example, consider the case where two users have worked on slightly different variations of the same source document. One version of the source document can be slightly older than the other. The two users may wish to merge their changes into a single document that is derived from one of the source documents, and which captures as many of the combined changes as possible. Since each delta document references a different source document, it is possible that a change specified to one source document may not make sense relative to the other version of the source document. For instance, person A may have removed a word from a sentence in source document 810. This change may not make sense when viewed against source document 830, in which the entire sentence containing the word removed by person A has been removed. In this case, the change for document 810 to remove the word would not be able to be applied to source document 830.

Figure 9:
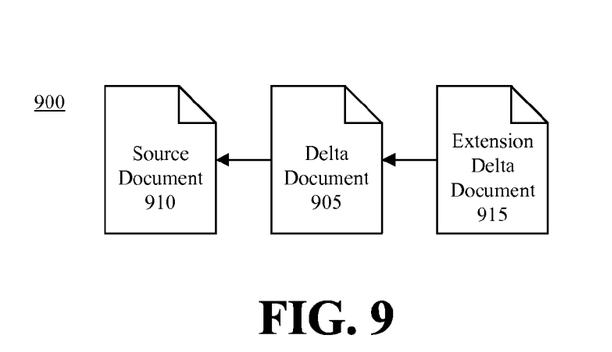
FIG. 9 is a block diagram illustrating yet another aspect of the present invention.

FIG. 9 is a block diagram illustrating yet another aspect of the present invention. In FIG. 9, a delta document 905 has been created to describe one or more delta operations to be applied to a source document 910. An extension delta document 915 has been created which effectively extends any delta operations specified by the delta document 905. That is, the extension delta document 915 specifies further delta operations to be applied to the source document 910, after the application of changes specified by the first delta document 905. The extension delta document 915 need not specify a reference to the source document 910. Instead, the extension delta document 915 can specify a reference to the first delta document 905 using an <extends> element.

It should be appreciated that a delta document, i.e., delta document 905, followed by one or more other delta documents, i.e., extension delta document 915, is logically equivalent to a single delta document. In other words, an updater can merge the delta operations specified by the chain of delta documents beginning with the root and continuing in order to generate a single, larger delta document comprising or specifying each of the delta operations from each of the individual delta documents and extension delta documents. If the chain of documents were processed by an updater, the result would be the same as if the single, larger delta document had been processed.

Figure 10:
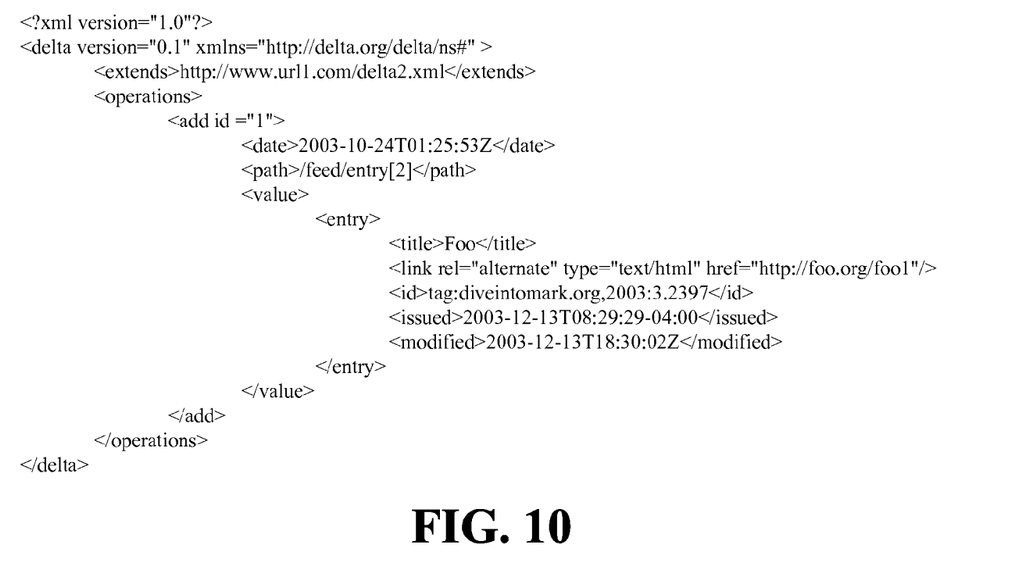
FIG. 10 is an exemplary source code listing for an extension delta document in accordance with another aspect of the present invention.

FIG. 10 is an exemplary source code listing for an extension delta document in accordance with another aspect of the present invention. The source code listing extends the delta document specified for the Atom feed source document of FIG. 5. The <extends> element specifies a URI that references the delta document that is being extended by the extension delta document. The operations in the extending delta document are assumed to follow those in the delta document being extended.

Delta operations have been described largely as being either "add" or "remove" operations. These operations can be extended and used in various combinations, however, to achieve more complex operations. In one embodiment, for example, the "add" operation can be augmented to implement a copy/paste function. In such an embodiment, a "from" location can be included in the "add" operation. The "from" location can specify the location in the source document from which data is to be copied. The copied data can be included into the source document, i.e., at a different location, rather than specifying the information to be added to the source document directly within the delta document using the <value> element.

A cut/paste operation can be implemented through a combination of a "remove" operation and an "add" operation. In that case, the "add" operation can reference a "from" location that coincides with the path specified in the "remove" operation. In other words, the data being removed via the "remove" operation would be the same data that is added by the "add" operation. The data that is removed is added in a different place within the source document.

A "from" location property included within the "add" operation further enables a set of "add" operations to place copies of the same block of data in multiple places. A first "add" operation can place referenced data at a location specified by the <path> element of the "add" operation. Subsequent "add" operations can reference the location of the added data as the "from" source for the data for such "add" operations. Alternatively, a single "add" operation with an XPath value that resolves to multiple locations can be used.

Delta operations can be extended to include a "group" attribute that enables a set of delta operations to be logically grouped together. By giving a set of delta operations the same value for the "group" attribute, it is possible to discern a group relationship among a set of delta operations. For example, a processor may elect to discard a set of common grouped delta operations if one of the operations were invalid.

In another aspect, the "from" reference can reference a location that is not located within the source document. In that case, the delta operation can effectively perform a copy operation from a document other than the source document followed by a paste operation into the source document.

Another aspect of the present invention is the nesting of operations. Operation nesting refers to the case where an <operation> element is used to enclose a list of child operations. Enclosing a list of child operations allows an updater to identify groups of related delta operations by a common "id". For example, a set of <add> elements can be enclosed with an <operation> element. The <operation> element then can be assigned an "id" attribute.

The nesting configuration described also enables a single delta document to include multiple <delta> elements. This ability allows a single delta document to specify changes for a plurality of source documents. Each <delta> element can specify a source document which may or may not be different from the source documents specified by other <delta> elements. The use of an additional element called a <deltaset> element can be used to enclose a set of <delta> elements. The <deltaset> element can be the root of the delta document.

In the case where reverse processing of a document is to be performed, an additional <value> element can be added to the "remove" operation. The additional <value> element provides information to support roll-back type processing where an end document is the source document and then changes are "rolled back" to determine a starting document similar to the revised source document described herein. An additional <end> element can be included as well as an additional <start> element to hold a URI reference to the final or "end state" document.

Including these additional features within the delta documents allows an updater to process delta operations in a forward chronological order against the referenced start document or in reverse chronological order against the end document to produce the start document. This sort of dual processing allows one to create a "one-sided" delta document that references either a start or end document, or a "two-sided" delta document that references both a start and an end document.

The value stored in the <value> element for the "remove" operation allows the opposite of a "remove" operation, i.e., an "add" operation, to be performed in the reverse direction against an end type of source document. The updater can obtain the removed element from the "remove" operation and place the removed element back into the source document. With one-sided delta documents, either the "add" or "remove" operations would all have to store values. In the two-sided case, both "add" and "remove" operations would have to store values.

Figure 11:
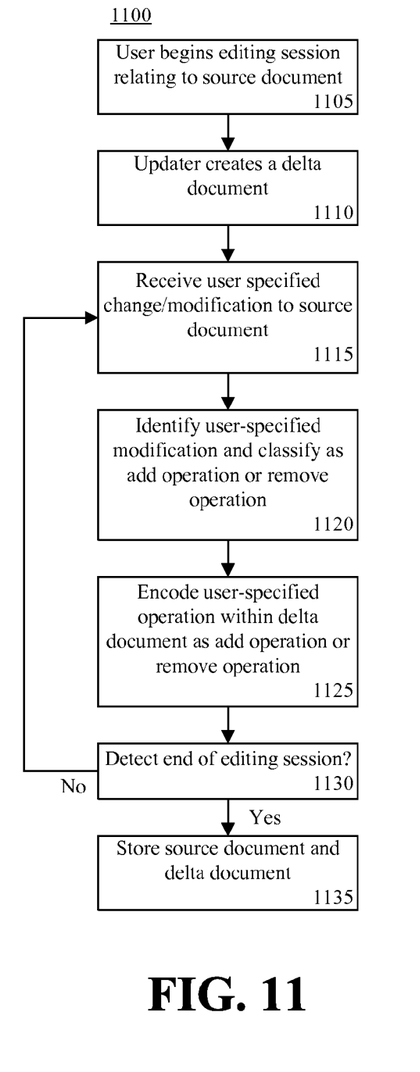
FIG. 11 is a flow chart illustrating a method of processing delta documents in accordance with another aspect of the present invention.

FIG. 11 is a flow chart illustrating a method 1100 of creating a delta document in accordance with another aspect of the present invention. The method 1100 can begin in a state where a source document exists and a user is working or editing the source document. The updater, for example, can be configured to work cooperatively with an application being used to edit the source document or can be integrated into such an application.

In any case, the method 1100 can begin in step 1105 where a user can begin an editing session for a source document. In step 1110, the application, or updater, can create a delta document. The creation of a delta document can include creating a document framework having one or more basic or essential items of information. For example, a delta document can be created with includes a reference to the source document.

In step 1115, a user specified change to the source document can be received. For example, such a modification can be detected by the application or indicated by the user via the application. In any case, the application can notify the updater or update component as the case may be. In step 1120, the change can be evaluated and characterized by the updater as an "add" operation or a "remove" operation. As noted, the updater further can characterize such a modification as an enhanced version of the "add" operation, such as a "copy/paste", or as a combination of "add" and "remove" operations, i.e., a "cut/paste". In step 1125, the user-specified modification can be encoded or written to the delta document as an "add" operation, a "remove" operation, or any combination thereof.

In step 1130, a determination can be made as to whether the end of the editing session has been detected. For example, the user can choose to save the document and quit the application, close the source document being edited, or otherwise indicate such an intention. If so, the method can continue to step 1135. If not, the method can loop back to step 1115 to continue processing. In step 1135, the source document along with the delta document, and optionally a revised version of the source document which incorporates the user specified changes, can be stored for later use or reference. It further should be appreciated that the source document, one or more delta documents, particular delta operations of one or more delta documents, and start and/or end type source documents can be presented if so desired.

In another example, a text document represented in Open Document Format (ODF), for instance, can be read by a parser or other processor as described herein. The parser can locate inline change descriptions within the text document. The change descriptions, when found, can be removed from the text document and a set of delta operations corresponding to the change descriptions within a delta document can be created. When complete, the result is a "clean" ODF document with none of the inline change descriptions remaining therein and a separate delta document, or set of delta documents, describing all of the changes. Such an embodiment accommodates other delta documents from other persons that may have been created against the same source document.

In yet another embodiment, a system can compare to different versions of a source document and derive a set of delta changes that describe the progression from one version to the next. In this embodiment, the delta operations may not describe the actual changes that produced the newer version of the source document. However, the delta document still can describe a set of changes to produce the second version of the source document. This delta document then can be operated upon using other delta operations specified in other delta documents. Further, the need to store two versions of the source document is eliminated.

Figure 12:
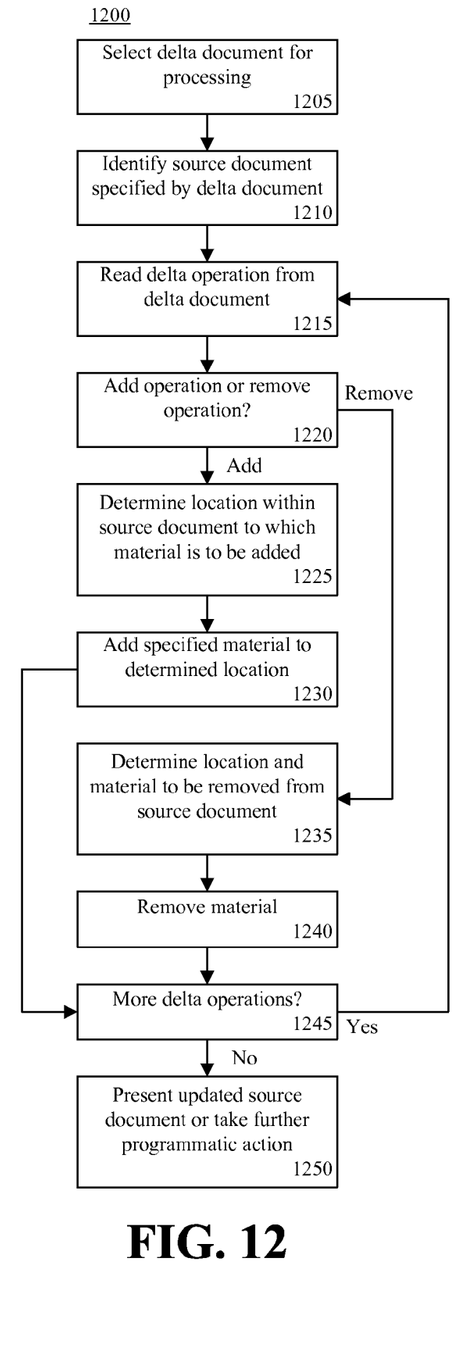
FIG. 12 is a flow chart illustrating a method of applying a delta document to a source document in accordance with yet another aspect of the present invention.

FIG. 12 is a flow chart illustrating a method 1200 of applying a delta document to a source document in accordance with yet another aspect of the present invention. The method 1200 illustrates the case where changes to a source document are specified by a single delta document. In step 1205, a delta document can be selected for processing. In step 1210, the updater can identify the source document specified by the delta document. In another embodiment, a source document can be selected. In that case, delta documents can be searched to locate the relevant delta document (or chain of delta documents) via the references contained within such documents. Alternatively, a record of source document and delta document associations can be maintained to reduce the search time needed.

In any case, in step 1215, a delta operation can be read from the delta document. In step 1220, the updater can determine whether the delta operation is an "add" operation or a "remove" operation. If the delta operation is an "add" operation, the method can proceed to step 1225. If the delta operation is a "remove" operation, the method can continue to step 1235. In step 1225, the location within the source document to which referenced material is to be added can be determined. In step 1230, the material indicated by the delta operation can be added to the source document.

In step 1235, the location, and thus, the material in the source document that is to be removed, can be determined. The material can be removed in step 1240. In step 1245, a determination can be made as to whether further delta operations are specified by the delta document. If so, the method can loop back to step 1215 to select a next delta operation in chronological order or reverse-chronological order depending upon whether the process is forward moving or reverse. If no further delta operations are to be performed, the updated or modified source document can be saved, presented to a user, i.e., displayed, printed, or rendered, or subjected to further processing in step 1250. As noted, the source document, one or more delta documents, particular delta operations of one or more delta documents, and start and/or end type source documents can be presented if so desired.

Though the methods of FIGS. 11 and 12 have been described with reference to the case where a single source document exists and modifications are described in a single delta document, it should be appreciated that more than one source document can be used and that, further, additional delta documents can be applied and/or created as the case may be.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of expressing a change history for a markup language document comprising:
    identifying a source markup language document and at least one modification to the source markup language document;
    creating at least one delta document specifying the modification to the source markup language document, wherein the delta document is independent of the source markup language document and is coded in a different language than the source markup language document, wherein creating the delta document comprises specifying each modification to the source markup language document, within the delta document, as an "add" operation or a "remove" operation comprising a reference to a location in the source markup language document to which each respective modification is to be applied and including, within each "add" operation and "remove" operation, a time stamp indicating when the modification was implemented; and
    storing, within a data storage device, the source markup language document and the delta document.

2. The method of claim 1, further comprising reading the delta document and applying the change specified by the delta document to the source markup language document to generate a modified version of the source markup language document.

3. The method of claim 1, wherein creating at least one delta document further comprises at least one of specifying within at least one "add" operation a reference to content outside of the delta document that is to be added at the location in the source markup language document or specifying within at least one "remove" operation a reference to content outside the delta document that is to be added at the location in the source markup language document when the "remove" operation is interpreted with reference to an end type of source document.

4. The method of claim 1, wherein creating at least one delta document further comprises at least one of specifying within at least one "add" operation a value element comprising content to be added or specifying within at least one "remove" operation a value element comprising content to be added when the "remove" operation is interpreted with reference to an end type of source document.

5. The method of claim 1, wherein creating at least one delta document creates a plurality of delta documents, the method further comprising combining the plurality of delta documents into a single delta document.

6. The method of claim 1, wherein creating at least one delta document creates a plurality of delta documents, the method further comprising applying changes specified by the plurality of delta documents to the source markup language document to generate a modified version of the source markup language document.

7. A method of expressing a change history for a markup language document comprising:
    identifying a plurality of source markup language documents and a modification to each of the plurality of source markup language documents;
    creating a delta document specifying the modifications for each of the plurality of source markup language documents, wherein the delta document is independent of each of the plurality of source markup language documents and is coded in a different language than each of the plurality of source markup language documents, wherein creating the delta document comprises specifying each modification to the plurality of source markup language documents, within the delta document, as an "add" operation or a "remove" operation comprising a reference to a location in the source markup language document of the plurality of source markup language documents to which each respective modification is to be applied and including, within each "add" operation and "remove" operation, a time stamp indicating when the modification was implemented; and
    storing, within a data storage device, the plurality of source markup language documents and the delta document.

8. The method of claim 7, further comprising selectively applying at least one change specified by the delta document to at least one corresponding source markup language document of the plurality of source markup language documents to generate a modified version of the at least one corresponding source markup language document.

9. A computer program product comprising:
    a computer readable medium having computer-usable program code stored thereon that expresses a change history for a markup language document, the computer program product comprising:
    computer usable program code configured to identify a source markup language document and a modification to the source markup language document;
    computer usable program code configured to create at least one delta document specifying the modification to the source markup language document, wherein the delta document is independent of the source markup language document and is coded in a different language than the source markup language document, wherein creating the delta document comprises specifying each modification to the plurality of source markup language documents, within the delta document, as an "add" operation or a "remove" operation comprising a reference to a location in the source markup language document of the plurality of source markup language documents to which each respective modification is to be applied and including, within each "add" operation and "remove" operation, a time stamp indicating when the modification was implemented; and computer usable program code configured to store the source markup language document and the delta document within a data storage device.

10. The computer program product of claim 9, further comprising computer usable program code configured to apply the change specified by the delta document to the source markup language document to generate a modified version of the source markup language document.

11. The computer program product of claim 9, wherein the computer usable program code configured to create at least one delta document further comprises at least one of computer usable program code configured to specify within at least one "add" operation a reference to content outside of the delta document that is to be added at the location in the source markup language document or computer usable program code configured to specify within at least one "remove" operation a reference to content outside the delta document that is to be added at the location in the source markup language document when the "remove" operation is interpreted with reference to an end type of source document.

12. The computer program product of claim 9, wherein the computer usable program code configured to create at least one delta document further comprises at least one of computer usable program code configured to specify within at least one "add" operation a value element comprising content to be added or computer usable program code configured to specify within at least one "remove" operation a value element comprising content to be added when the "remove" operation is interpreted with reference to an end type of source document.

13. The computer program product of claim 9, wherein the computer usable program code configured to create at least one delta document creates a plurality of delta documents, the computer usable program code further comprising computer usable program code configured to combine the plurality of delta documents into a single delta document.

14. The computer program product of claim 9, wherein the computer usable program code configured to create at least one delta document creates a plurality of delta documents, the computer usable program code further comprising computer usable program code configured to apply each change specified by the plurality of delta documents to the source markup language document to generate a modified version of the source markup language document.

* * * * *